US008726958B2

(12) United States Patent
Merrill (10) Patent No.: US 8,726,958 B2
(45) Date of Patent: May 20, 2014

(54) INERTIA-CONTROLLED TIRE ISOLATION VALVE AND METHODS OF CONTROLLING TIRE INFLATION PRESSURES

(75) Inventor: Zachary A. Merrill, Greenville, SC (US)

(73) Assignees: Compagnie Generale des Etablissements Michelin (FR); Michelin Recherche et Technique. S.A. (CH)

( * ) Notice: Subject to any disclaimer, the term of this patent is extended or adjusted under 35 U.S.C. 154(b) by 429 days.

(21) Appl. No.: 13/149,379

(22) Filed: May 31, 2011

(65) Prior Publication Data

US 2012/0305126 A1 Dec. 6, 2012

(51) Int. Cl.
*B60C 23/12* (2006.01)

(52) U.S. Cl.
USPC ........................................... 152/417; 152/415

(58) Field of Classification Search
USPC ............ 152/415, 416, 417, 418, 419; 137/53, 137/57; 73/146.8
See application file for complete search history.

(56) References Cited

U.S. PATENT DOCUMENTS

| 2,161,384 | A | * | 6/1939 | Rinfret | 152/418 |
| 3,090,394 | A | * | 5/1963 | Page | 137/56 |
| 4,349,064 | A |   | 9/1982 | Booth | |
| 4,434,833 | A | * | 3/1984 | Swanson et al. | 152/417 |
| 4,570,691 | A | * | 2/1986 | Martus | 152/332.1 |
| 4,657,057 | A |   | 4/1987 | Ha | |
| 5,616,196 | A |   | 4/1997 | Loewe | |
| 6,871,531 | B2 |  | 3/2005 | Huang | |
| 7,237,590 | B2 |  | 7/2007 | Loewe | |
| 7,284,585 | B2 |  | 10/2007 | Ogawa | |
| 7,322,392 | B2 |  | 1/2008 | Hawes | |
| 8,307,868 | B2 | * | 11/2012 | Medley et al. | 152/417 |
| 2009/0283190 | A1 | * | 11/2009 | Padula et al. | 152/417 |

FOREIGN PATENT DOCUMENTS

| DE | 3803867 A1 * | 8/1989 |
| EP | 1 733 902 A2 | 12/2006 |
| WO | 2010 141638 A1 | 12/2010 |

* cited by examiner

*Primary Examiner* — Kip T Kotter
(74) *Attorney, Agent, or Firm* — Hahn Loeser & Parks LLP; Bret A. Hrivnak, Esq.

(57) ABSTRACT

Embodiments of the invention include methods and apparatus for adjusting the inflation pressure of a pneumatic tire. Particular methods include the step of arranging a tire in fluid communication with an inflation pressure source on a vehicle. Further steps may include arranging a rotational fluid passage between the tire and a vehicle axle and arranging along the rotational fluid passage an inertia valve that is biased in a closed arrangement while the valve is stationary or rotating below a desired speed about a rotational axis. Such methods may further include the steps of opening the inertia valve when the valve is rotating about the rotational axis at or above the desired speed and adjusting automatically the inflation pressure of the tire through the rotational fluid passage while the valve is open. Other embodiments comprise a system for adjusting the inflation pressure of a pneumatic tire.

20 Claims, 5 Drawing Sheets

INERTIA-CONTROLLED TIRE ISOLATION VALVE AND METHODS OF CONTROLLING TIRE INFLATION PRESSURES

BACKGROUND OF THE INVENTION

1. Field of the Invention

This invention relates generally to methods and apparatus for inflating tires, and more particularly, to methods and apparatus for selectively opening and closing access to a tire for inflation or deflation operations.

2. Description of the Related Art

The use of central tire inflation systems and tire maintenance systems are known. For example, over-the-road trucks, road tractors, and tractor trailers may be equipped with a tire inflation or maintenance system such as the Meritor® Tire Inflation System (MTIS) by Pressure Systems International (P.S.I.), the AIRGO® tire inflation system by AIRGO, Inc., the Cat's Eye® system by Link Manufacturing, Ltd., or a system provided by Dana Corp.

Such systems typically utilize pressurized air generated by a vehicle's compressor for use by the vehicle's braking system. The pressurized air is supplied to a rotating wheel hub by way of either a hollow axle or an air hose arranged in communication with the pressure source. A rotational coupling is arranged in communication with the wheel axle to transfer the supplied air to a tire mounted on a wheel that is attached to a hub rotationally mounted on the axle. An air hose extends from the rotational coupling to the tire's valve stem to facilitate the supply of air to the tire. A check valve is also arranged between the air source and the tire to facilitate pressurization of the tire while also preventing unintentional deflation thereof. A non-self relieving pressure regulator is typically used and arranged between the pressure source and the tire to control the supply pressure.

The check valves arranged along the air supply paths in these systems are one-way check valves, which allow air to flow into the tire but not from the tire. Typically, the check valves are Schrader valves, which generally provide low flow rates and impede rapid inflation of a tire. While these systems are known to increase tire inflation pressures when below a desired pressure, there are instances where the tire may become over inflated. For example, the tire pressure may be unintentionally over inflated or it may increase with increasing air temperature. Over inflation can be detrimental to tire and vehicle performance. For example, an over inflated tire may result in lower traction and increased wear. Over inflation may also increase tire stiffness, which may reduce vehicle ride comfort.

Therefore, there is a need to reduce a tire's internal air pressure to obtain a more desirable pressure. In the noted systems, however, the check valves prevent any flow of pressurized air from the tire's pressurization chamber. Accordingly, there is a need to better regulate a tire's internal pressure by providing a valve that not only allows an increase in tire pressure during vehicle operation, but also a decrease in tire pressure during vehicle operation.

SUMMARY OF THE INVENTION

Particular embodiments of the present invention include methods and apparatus for adjusting the tire inflation pressure of a pneumatic tire. Particular embodiments of the invention comprise a tire inflation system, the system including a pressure source and a pressure controller in communication with the pressure source. The system may further include a rotational fluid passage arranged between a tire and a vehicle axle, the rotational fluid passage being in fluid communication with the pressure source. The rotational fluid passage is configured to rotate about a rotational axis and includes an inertia valve configured to operate between a normally closed valve arrangement and an open valve arrangement. The valve includes a compressible biasing member in communication with a mass displaceable in a radial direction relative to the rotational axis. The biasing member is configured to operate between an expanded arrangement and a compressed arrangement. The mass is configured to translate between a valve closed position and a valve open position. In the closed valve arrangement, the biasing member is in the expanded arrangement and the mass in the valve closed position. In the open valve arrangement, the biasing member is in the compressed arrangement and the mass in the valve open position. When in the valve open position, the mass is located a greater distance from the rotational axis than in the valve closed position. The mass is configured to translate from the valve closed position to the valve open position when centrifugal forces acting on the mass are sufficient to overcome a spring force of the biasing member, the centrifugal forces arising as the valve rotates about the rotational axis at a desired rotational speed.

Further embodiments of the invention include methods for adjusting the inflation pressure of a tire. Such methods may include the step of arranging a tire in fluid communication with an inflation pressure source on a vehicle. Further steps may include arranging a rotational fluid passage between the tire and a vehicle axle and arranging along the rotational fluid passage an inertia valve that is biased in a closed arrangement while the valve is stationary or rotating below a desired speed about a rotational axis. Such methods may further include the steps of opening the inertia valve when the valve is rotating about the rotational axis at or above the desired speed and adjusting automatically the inflation pressure of the tire through the rotational fluid passage while the valve is open.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

The present invention concerns improvements to automatic tire inflation systems, such as central tire inflation systems, and methods for controlling tire inflation. In particular, the improvements include arranging a rotationally actuated valve within a rotational fluid passage of a tire inflation system. In such systems, inflation pressure is commonly communicated between a non-rotating pressurized gas source (which is referred to herein as a "pressure source") and a rotating tire. To achieve this, various methods are used within the art to communicate the pressurized gas between non-rotating and rotating portions of the vehicle. For example, a rotational coupling may be arranged in communication with a non-rotating axle or spindle of a vehicle. By further example, a passage may be formed between a vehicle's non-rotating spindle and a hub rotating about the spindle. Regardless, a portion of each system includes a rotational passage generally extending radially outward from the axle, hub, or spindle until reaching a tire mounted on a wheel. Typically, these systems employ a one-way check valve that facilitates tire inflation as needed, but which also prevents tire deflation when inflation is not necessary. Accordingly, there is no manner to deflate the tire (i.e., reduce the tire inflation pressure) using the same fluid path used to increase tire inflation pressures. Instead, other methods must be used to deflate the tire.

Particular embodiments of the invention include methods for adjusting and/or controlling the inflation pressure of a pneumatic tire. Such methods may comprise various steps. In particular embodiments, such methods include the step of arranging a tire in fluid communication with a pressure source. Because the methods concern adjusting and controlling a tire's inflation pressure, such adjustments contemplate increasing a tire's inflation pressure. To accomplish this, a pressure source provides pressurized gas having a positive pressure, which is defined herein to be a pressure above vacuum pressure. Vacuum pressure comprises a pressure equal to or below 5 pounds-force per square inch absolute (psia) or equal to or below 0 psia. Accordingly, pressure source may comprise any known means, such as a compressor or pressure tank. The pressure source may a source provided by the vehicle, such an air compressor used to provide positively pressurized air for a vehicle braking system, which is often employed by heavy-duty trucks and road tractors.

Because adjusting and/or controlling a tire's inflation pressure may include reducing a tire's inflation pressure, pressure source may also comprise a vacuum source. The vacuum source may comprise a vacuum pump, for example, or any other known means for providing vacuum pressure. Any other known means for reducing the inflation pressure may be utilized in lieu of vacuum pressure, such as a pressure relief valve or other known pressure venting devices.

To provide gas of different pressures, a pressure controller may be provided to adjust the output pressure of the pressure source. For example, the pressure controller may comprise any known pressure regulator, such as a mechanically operating regulator or an electrical regulator. A mechanically operating pressure regulator using a compressible member, such as a diaphragm, to adjust the output pressure of a gas passing there through. Such a regulator may comprise a self-relieving pressure regulator, which may be desirable when reducing the tire inflation pressure. The self-relieving regulator vents any back pressure from an output or downstream side of the regulator, unlike ordinary mechanically operated pressure regulators that do not relieve such back pressure. In such instances the back pressure is the tire inflation pressure, and because the tire inflation pressure is a pressure higher than the regulated pressure setting (i.e., the desired pressure of the tire) the elevated tire inflation pressure would be relieved until reaching the desired regulated pressure. The desired regulated pressure for a mechanical pressure regulator may be set manually or automatically, such as by pilot control. An exemplary electrical regulator is an electropneumatic regulator, which utilizes transducers and may be electronically controlled by a programmable logic controller (PLC).

A further step of such methods includes arranging a rotational fluid passage between the tire and a vehicle axle. The pressure source is generally communicated from a static or non-rotational pressure source, that is, a pressure source arranged on a non-rotational portion of the vehicle. For example, the pressure source may be non-rotationally mounted near the engine or along a frame of the truck or trailer. Accordingly, tire inflation systems communicate the pressurized gases to the tire by way of a fluid communication path arranged there between. Because the tire is configured to rotate, the fluid communication path includes a rotational fluid passage extending between a rotatable tire or wheel and a non-rotating portion of the vehicle, such as a non-rotating axle or spindle, for example. The rotational fluid passage is in fluid communication with both the tire and a pressure source of the tire inflation system. Generally, the rotational fluid passage extends radially outward from an axle, spindle, hub and/or wheel to an outer rim portion of the wheel, a tire valve stem, or more generally a tire. The rotational fluid passage is described more fully below in association with the exemplary embodiments shown in the Figures provided herewith.

An additional step in performing the methods herein includes arranging along the rotational fluid passage an inertia valve that is biased in a closed arrangement while the valve is stationary or rotating below a desired speed about a rotational axis. To facilitate an increase or decrease in the tire inflation pressure during tire operation while also preventing tire deflation when the vehicle is stationary (not rotating), a rotationally actuated valve ("inertia valve") is arranged along the rotational fluid passage. Such a device is configured and arranged to open as sufficient centrifugal forces are applied to the valve during valve rotation. More specifically, the valve is configured to open at a desired rotational speed of the valve, which is related to a particular rotational speed of a tire, wheel, hub, or axle. The rotational speed of the valve can also be related to the vehicle speed. Because the tire and wheel generally rotate about an axle, and the inertia valve is generally arranged between the axle and the tire to rotate with the tire/wheel assembly, the rotational speed may be determined in relation to a rotational axis of an axle, tire, or wheel, which in the most common instances is the same axis.

Another step in performing the methods herein includes opening the inertia valve when the valve is rotating about the rotational axis at or above the desired speed. As noted above, the valve is configured to open from a closed arrangement due to centrifugal forces action upon the valve as the valve rotates about a rotational axis. In particular embodiments, the valve includes a compressible biasing member in communication with a mass displaceable in a radial direction relative to the rotational axis. The biasing member is configured to operate between an expanded arrangement and a compressed arrangement. For example, the biasing member may comprise a compressible spring or a compressible pressurized fluid chamber. The mass is configured to translate between a valve closed position and a valve open position. In the closed valve arrangement, the biasing member is in the expanded arrangement and the mass in the valve closed position. In the open valve arrangement, the biasing member is in the compressed arrangement and the mass in the valve open position. In the valve open position, the mass is located a greater distance from the rotational axis than in the valve closed position. In this arrangement, the mass is configured to translate from the valve closed position to the valve open position when centrifugal forces acting on the mass are sufficient to overcome a spring force of the biasing member. The valve is configured, such that sufficient centrifugal forces arise when the valve rotates about the rotational axis at a desired rotational speed. Operation of the inertia valve is discussed more fully below in association with the exemplary embodiments shown in the Figures provided.

A further step of the methods includes adjusting automatically the inflation pressure of the tire through the rotational fluid passage while the valve is open. As suggested previously, the inflation pressure may be controlled or managed by a pressure controller. Such a pressure controller may employed to perform this step of automatically adjusting the inflation pressure. As discussed above, the pressure controller may include any known pressure regulator, such as a self-relieving pressure regulator. While the pressure regulator may be controlled manually or automatically, it operates to automatically adjust the inflation pressure of the tire until the desired inflation pressure is achieved. This adjustment may include increasing the tire inflation pressure if the tire inflation pressure is below a desired pressure and reducing the tire inflation pressure if the tire inflation pressure is above a desired pressure.

Exemplary embodiments of an inertia or rotationally actuated valve and a tire inflation system for use in performing such methods are discussed in further detail below.

The present invention provides an improvement to tire inflation systems. In particular embodiments, the invention includes an inertia or rotationally actuated valve that controls the flow of pressurized gases, such as air or nitrogen, to and from a tire. The valve is arranged along a rotational fluid passage or passage assembly extending generally radially outward from an axle, hub, wheel or spindle, the rotational passage being in fluid communication with both the tire and a pressure source of the tire inflation system. The valve rotates with a tire and wheel, and is biased in a closed position when the vehicle is at rest ("stationary") or in operation below a desired speed. Upon reaching a desired rotational speed, however, the valve opens when centrifugal forces acting upon a mass in the valve overcome a biasing member, which is compressed by the mass to thereby open the valve. When open, pressurized gases are able to flow into or out from the tire to increase or decrease the tire's inflation pressure. The flow of pressurized gases may be further controlled by a pressure controller, which may operate mechanically or electrically. Maintenance of tire pressure is desirable not only to optimize tire performance, but also to provide safe vehicle operation. Such maintenance may include adjusting the tire inflation pressure when the tire is under or over inflated. For example, a tire may be unintentionally inflated below or above a desired tire pressure or may become over or under inflated due to a change in tire operating temperatures. Further, a pressure leak may give rise to an under inflation condition.

Figure 1:
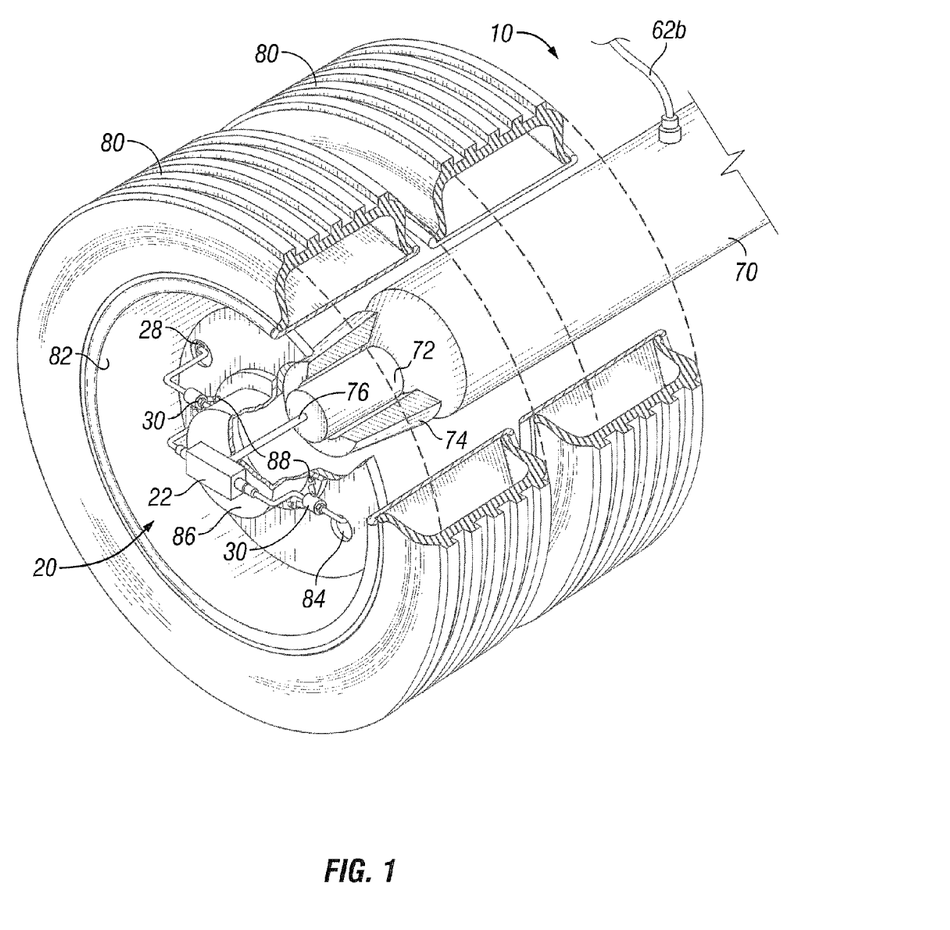
FIG. 1 is a perspective view of a tire/wheel assembly showing a rotational fluid passage in fluid communication with a stator extending from an axle spindle to connect the tire inflation system to the rotational tire, according to an exemplary embodiment.

The subject invention will now be discussed in further detail in association with the exemplary embodiments shown in the Figures provided. With reference to FIG. 1, a partial view of an exemplary tire inflation system 10 is shown in conjunction with a tire/wheel arrangement. In the tire inflation system 10 shown, a rotational fluid passage 20 is in fluid communication with a non-rotational pressurized gas source (which is also referred to herein as a "pressure source"). In particular, a non-rotating fluid passage 76 (or "stator") extends between, and is in fluid communication with, a spindle 72 and a rotational coupling 22 of rotational fluid passage 20. Spindle 72 forms a non-rotational portion of a vehicle axle, and wheel 82 mounts to a rotational hub 74 configured to rotate about the spindle. The rotational fluid passage 20 is also shown in a side view for additional clarity in FIG. 2.

Figure 2:
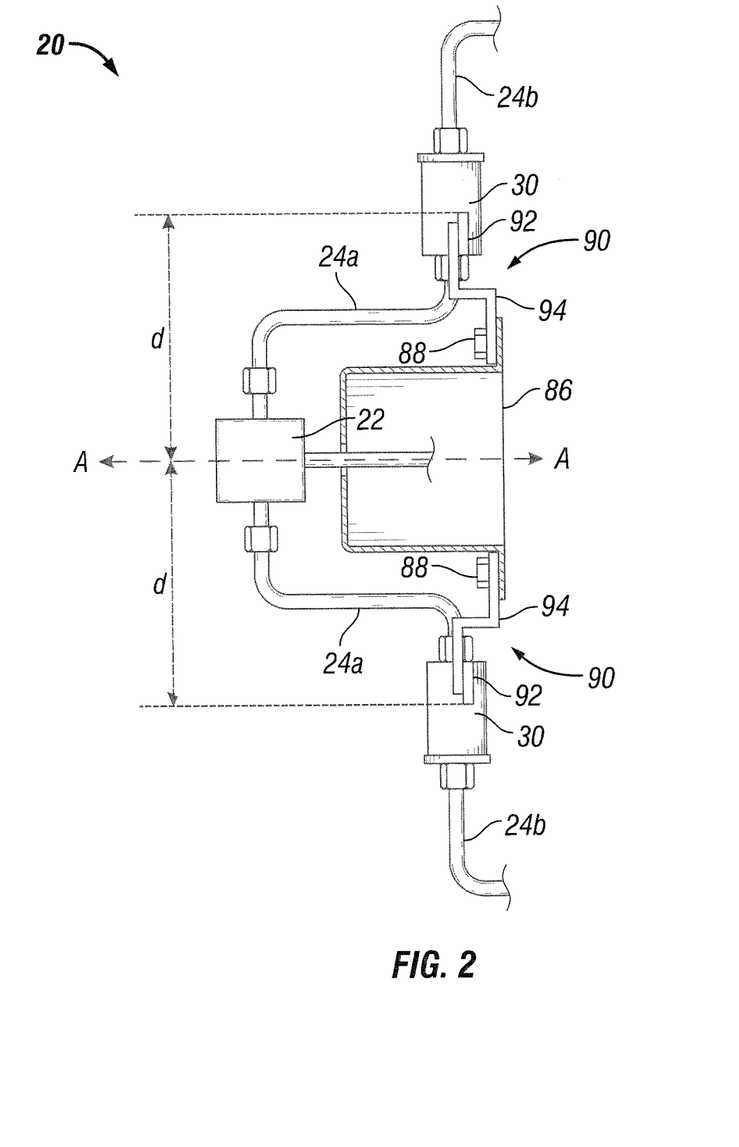
FIG. 2 is a side view of the fluid passage shown in FIG. 1.

With reference to FIGS. 1-2, rotational coupling 22 rotates relative to non-rotating fluid passage 76 and spindle 72. Rotational coupling 22 includes a fluid inlet and at least one fluid outlet. As shown, coupling 22 includes an inlet in communication with stator 76 and a pair outlets from which conduits 24a extend. It is understood that rotational coupling 22 may comprise any known device capable of receiving and discharging fluid while also being capable of rotating relative to a fluid input device attached thereto.

Rotational fluid passage 20 further includes one or more fluid conduits to fluidly connect rotational coupling 22 and an inertia valve 30 with tire 80. In the embodiment of FIGS. 1-2, fluid conduit 24a fluidly connects rotational coupling 22 with valve 30, which is shown initially extending from coupling 22 in a radial direction. Subsequently, each conduit 24a navigates at right angles about hub cap 86 until connecting to a first end of valve 30. A second conduit 24b then extends from a second end of each valve 30 and through wheel 82, such as through an aperture 84, to gain access to tire 80. A terminal end of conduit 24b is adapted for attachment to any tire, tire valve stem, or tire wheel. In the embodiment shown in FIGS. 1-2, conduit 24b is a tube having a terminal end adapted for connection with a tire valve stem 28, but may comprise any desired form sufficient to communicate pressurized gases between a tire and pressure source. While two arrangements of conduits 24a, 24b are shown for the purpose of accessing a tire stem of each tire 80 shown, only one arrangement of conduits 24a, 24b is necessary when a single tire is provided.

An inertia valve 30 is shown arranged within rotational fluid passage 20 in FIGS. 1-2. Inertia valve 30 is rotationally actuated between closed and open arrangements and may be arranged at any location along assembly, provided that it is arranged to open when sufficient rotational forces arise during tire rotation. Any such arrangement for opening valve 30 is based upon the rotational speed upon which the valve is desired to open, as well as the particular design of valve 30 and the fluid passage 20 arrangement being employed. In the embodiment shown, a valve 30 is arranged between each rotational coupling 22 and tire 80. It is also appreciated that valve 30 may be arranged between the non-rotational tube 76 and rotational coupling 22, although centrifugal forces generally increase as the distance d between the valve and the rotational axis A-A of the tire/wheel assembly increases.

Figure 3:
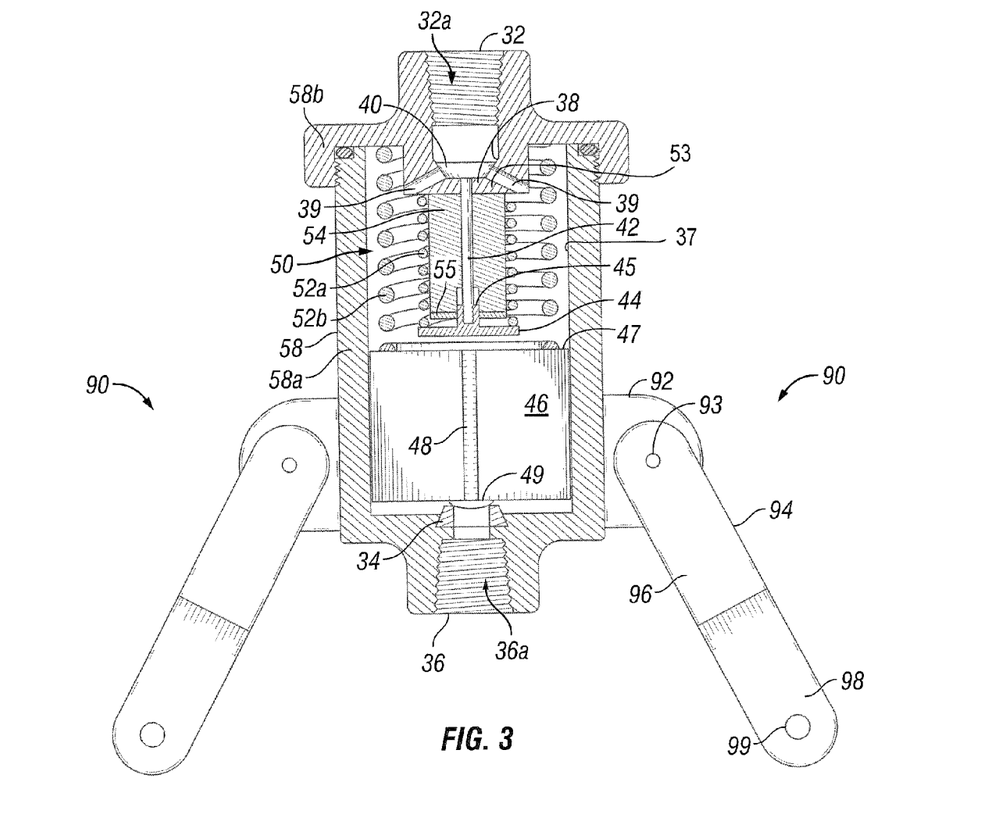
FIG. 3 is a partial sectional view of the inertia valve arranged within the rotational fluid passage of FIGS. 1-2, the valve being arranged in a closed arrangement according to an exemplary embodiment. The displaceable mass, the first sealing member with shaft, and mounting brackets being shown in side view form.
Figure 4:
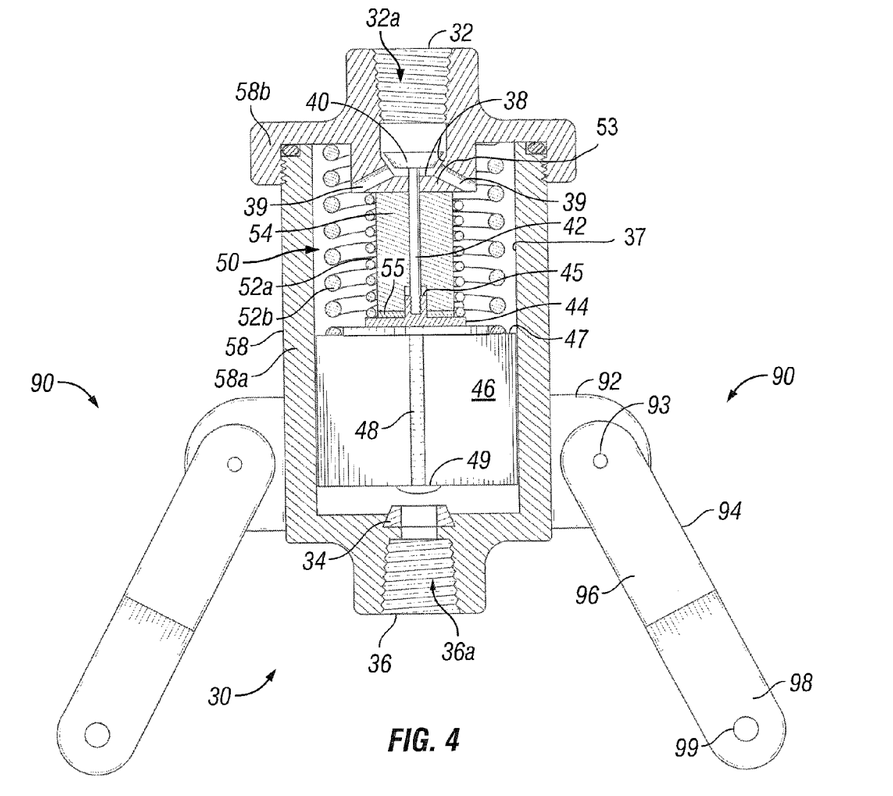
FIG. 4 is a partial sectional view of the inertia valve arranged within the rotational fluid passage of FIGS. 1-2, the valve being arranged in an open arrangement according to an exemplary embodiment. The displaceable mass, the first sealing member with shaft, and mounting brackets being shown in side view form.

Valve 30 is rotationally actuated between open and closed arrangements, whereby valve is configured to open when sufficient rotational forces are generated as the valve rotates about a rotational axis, and configured to close when the rotational speed of the valve is below a desired speed and to remain closed while at rest or stationary. Various designs may be employed to achieve the intended purpose of the valve. With reference now to FIGS. 3-4, an exemplary inertia valve 30 is shown. Generally, inertia valve 30 includes a compressible biasing means 50 in communication with a mass 46 displaceable in a radial direction relative to rotational axis A-A. Biasing means 50 is configured to operate between an expanded arrangement and a compressed arrangement, while mass 46 is configured to translate between a valve closed position and a valve open position as the biasing member expands and contracts. Accordingly, when mass 46 is in the closed valve arrangement as shown in FIG. 3, biasing means 50 is in the expanded arrangement. And when mass 46 is in the open valve arrangement as shown in FIG. 4, the biasing means is in the compressed arrangement. It is understood that while in the expanded arrangement, biasing means 50 is still compressed to provide sufficient closure forces against mass 46. Such compression, though, is comparatively less than the compression experienced by biasing means 50 when mass 46 is in the valve open position. In the valve open position, the valve open position of mass 46 is located a greater distance d from the rotational axis than when mass 46 is in the valve closed position. In the embodiment shown, biasing member 50 generally comprises first and second biasing members 52a, 52b, which collectively provide a total spring force that mass 46 must overcome to open valve 30. It is understood, however, that biasing means 50 may comprise a single spring or any other one or more known biasing means having elastic properties (i.e., are compressible and capable of recovering at a portion of its shape after deformation). For example, a biasing means may comprise an air spring or a mass formed of an elastomeric material, such as natural or synthetic rubber.

With reference now to FIGS. 2-4, inertia valve 30 and mass 46 are arranged a particular distance d from the rotational axis A-A such that mass, in combination with the centrifugal forces acting upon the mass during valve rotation, creates a sufficient force to overcome a spring force of the biasing means 50. This cause valve 30 to open as mass 46 translates between the valve closed and open positions. Accordingly, mass 46 may be arranged any distance d from rotational axis A-A based upon the weight of mass 46 and the spring force of biasing means 50 such that the mass compresses biasing member to open valve 30 at a desired rotational speed of valve 30 or mass 46.

Figure 5:
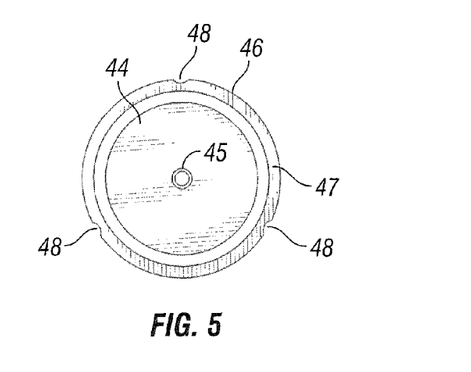
FIG. 5 is a top view of the valve's displaceable mass shown in FIGS. 3-4.

Further details of valve 30 are discussed below in association with the exemplary embodiments in FIGS. 3-5. Inertia valve 30 includes a first end 32 having a first aperture 32a and a second end 36 having a second aperture 36a, where the first and second ends are in fluid communication by way of a fluid passage extending through the valve. A first valve seat 38 is formed about first end aperture 32a and is configured operate with a first sealing member 40 to selectively allow fluid flow through first aperture 32a. In particular with regard to the embodiment shown, first sealing member 40 controls fluid flow between first aperture 32a and one or more fluid channels 39 extending into an internal valve chamber 37 extending in fluid communication between first and second apertures 32a, 36a. A first biasing member 52a biases first sealing member 40 in a closed arrangement against first valve seat 38. In the exemplary embodiment, biasing member 52a comprises a compression spring arranged about a cylindrical central valve structure 54 to control alignment of the spring. Structure 54 may be formed of any material and with cap 58b or separately there from for operable attachment to said cap 58b (such as to intermediate structure 53 as shown). Spring 52a is arranged to extend lengthwise in compression between an upper stop and a lower stop to forcefully displace first sealing member 40. In the embodiment shown, upper stop forms an intermediate structure 53 arranged below apertures 39 to form said apertures and valve seat 38. Intermediate structure 53 may be formed of any material, and may be formed with cap 58b or operably attached to cap. In the embodiment shown, to facilitate attachment of intermediate structure 53 to cap 58b, one or more apertures 39 arranged above structure 53 do not extend annularly around valve seat 38 but rather are intermittently spaced around the valve seat 38 or an axis extending longitudinally between first and second ends 32, 36. Also in the embodiment shown, the lower stop is associated with a base 44 having a central receptacle 45 for operable attachment to a shaft 42 extending from first sealing member 40. Such attachment may be removable, such as by use of threading, a fastener, or temporary adhesive, or may be non-removable and permanent. A cushion 55 formed of any elastomeric or energy-absorbing material is arranged between the central structure 45 and base 44 to absorb any impact between the two components as first sealing member is displaced between open and closed arrangements. A cushion may also be arranged between the base and mass 46 to perform similar functions.

A second valve seat 34 is also shown in conjunction with a second sealing member 49 as a secondary means for selectively closing valve 30 and second aperture 36a. In particular, second valve seat 34 is arranged to be selectively engaged by second sealing member 49, whereby second sealing member selectively controls fluid flow through second aperture 36a and internal valve chamber 37 upon achieving sufficient engagement. A second biasing member 52b biases second sealing member 49 in a closed arrangement against second valve seat 34. In the exemplary embodiment shown, second biasing member 52b comprises a compression spring extending lengthwise in compression between an upper stop and a lower stop to forcefully displace second sealing member 49. The upper stop forms an inner surface of housing 58 (i.e., cap 58b) while the lower stop forms a stepped surface 47 along a top of mass 46. Because second biasing member 52b is configured to displace mass 46, second sealing member 49 is arranged opposite second biasing member 52b along a bottom surface of mass 46. Still, first biasing member 52a is arranged centrally within (and coaxial with) second biasing member 52b, where the sum of the spring forces of the springs produce a collective spring force that mass 46 must overcome to open the valve 30 and allow fluid flow there through.

It is understood that first and second sealing members 40, 49 are provided to facilitate opening and closing of valve 30, and that any sealing member known may be employed as each are only shown to represent exemplary sealing members. In other variations, it is further understood that only one of the first and second sealing members may be provided, which may be of the same or different design. For example, when first sealing member 40 is provided without second sealing member 49, first sealing member may remain independent of mass 46 as generally shown in the Figures, or may be operably attached to mass 46, such as through shaft 42, whereby any movement of mass 46 also moves first sealing member 40. It is also appreciated that first sealing member 40 may be operably attached to mass 46 whether one or both sealing members 40, 49 are provided. In such instances, biasing means 50 may comprise one or both biasing members 52a, 52b. Further, it is understood that each valve seat 34, 38 and sealing member 40, 49 may be formed of any material sufficient to form a seal there between, such as any rigid, compressible, or elastic material. For example, at least one of the valve seat and sealing member of each pair of engaging valve seats and sealing members comprises a compressible or elastic material while the other is formed of any other material, where a first pair comprises valve seat 34 and sealing member 49 and a second pair comprises valve seat 38 and sealing member 40.

Mass 46 is configured to translate radially to open and close valve 30, and comprises a weight sufficient to compress a biasing means 50 at a desired rotational speed to open valve 30. In the embodiment shown, mass 46 comprises a cylinder, but may comprise any desired shape or may be formed of any desired material of desired density. To facilitate fluid flow through the valve 30 when opened, a fluid passage extends between first and second ends and navigates about or through mass 46. With reference to FIGS. 3-4, mass 46 may include one or more chases 48 extending through the mass such that the fluid passage of the valve extends at least in part through the mass. Chases 48 extend between opposing ends (top and bottom ends) of the mass 46, and may be arranged along an outer side of the mass as exemplarily shown or at any other location inward an outer side. In addition to, or lieu of, chases 48, a desired gap may be arranged between the mass and any adjacent structure, such as housing 58 to provide a fluid passage about mass 46. In any event, the fluid passage of the valve (in total) is designed to achieve a desired flow rate. For example, the flow rate of the valve may be at least approximately equal to the flow rate within any conduit 24a, 24b attached thereto. Accordingly, the cross-sectional area at any location within valve 30 may be approximately equal to the cross section of the fluid passage within any conduit 24a, 24b.

With reference to FIGS. 3-4, valve 30 includes an enclosure 56 generally providing a central chamber through which fluid passes between first and second ends 36, 32. Enclosure 56 may comprise any desired structure of size and shape. In the embodiment shown, housing 56 includes a body 58a forming a receptacle and a cap 58b removably connected to body 58a.

A mounting bracket 90 may also be employed to secure valve 30 to a vehicle. This bracket may be at least in part integral or unitary with valve housing 58, or may be configured to be removeably attached to valve housing 58. With reference to FIGS. 1-4, the present embodiment provides a bracket 90 comprising a longitudinal member 94 extending outwardly from mounting members 92 arranged on opposing sides of valve housing 58. The attachment between each longitudinal member 94 and each mounting member 92 is pivotably adjustable by use of fasteners to accommodate different patterns of bolts 88, although the attachment there between may be fixed and even unitary. For example, longitudinal members 94 are operably attached to a mounting member 92 using aperture 93 (which is arranged adjacent to a corresponding aperture arranged within mounting member 92) and any desired fastener, such a nut & bolt, pin, or rivet. An aperture 99 is arranged at the opposing terminal end of each longitudinal member 94 to receive a hub cap bolt 88 or any other known securing device. Aperture 99 may form a hole or a slot, which may provide additional capabilities to adapt to other bolt patterns. To provide sufficient clearance between wheel 82 and valve 30, longitudinal members 94 comprise a first portion 96 extending from a first terminal end for securement to mounting member 92 and a second portion 98 offset from first portion 96 in an axial direction relative to rotational axis A-A. Bracket 90 extends from opposing sides of the valve 30 to provided additional support and rigidity to valve 30. It is understood that any mounting bracket may be employed to attach valve 30 to any component of wheel 82. It is also understood that valve may not include a mounting bracket and may instead connect only by way of first and second ends to any fluid conduit 24a, 24b, rotational coupling 22, or tire valve stem 28.

In operation, with reference to FIG. 3, second biasing member 52a biases mass 46 in a valve closed arrangement, which forces second sealing member 49 against second valve seat 34. First biasing member 52b also forces first sealing member 40 against first valve seat 38 to close fluid flow through first aperture 36a. This closed arrangement occurs while valve 30 is in a stationary or non-rotational arrangement, or rotating below a desired rotational speed at which the valve is designed to open.

With reference now to FIG. 4, valve 30 opens when valve rotates at a desired speed about a rotational axis A-A. Upon reaching the desired speed, sufficient centrifugal forces act upon mass 46 to thereby displace said mass in a radially outward direction against second biasing member 52b. This initially causes second sealing member to disengage second valve seat 34 and open flow through second aperture 36a. However, flow through valve 30 is not yet open. This is because mass 46 and first sealing member 40 are independently displaceable. Once second biasing member 52b is sufficiently displaced by mass 46, mass then engages first biasing member 52a. As first biasing member begins to compress by way of mass 46, first sealing member disengages first valve seat 38 and flow through first aperture 32a is opened. Now, both first and second apertures 32a, 36a are open for fluid flow as mass 46 overcomes the spring force of both first and second biasing members 52a, 52b. As the rotational speed of valve 30 falls below the desired valve opening speed, however, the reverse occurs and the valve closes.

Figure 6:
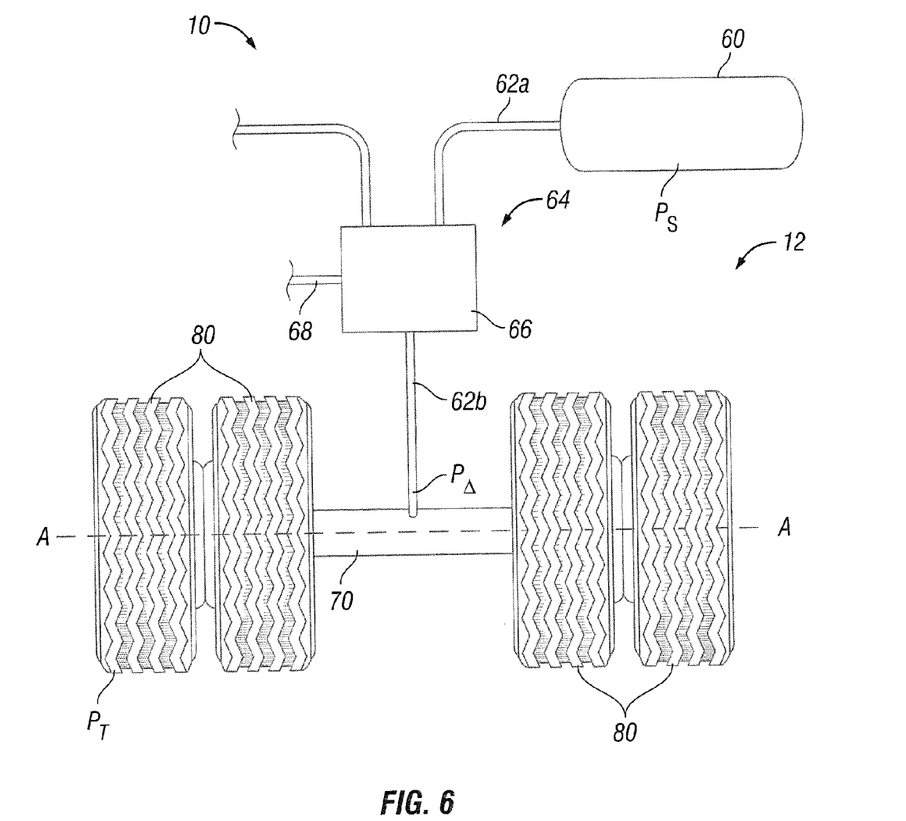
FIG. 6 is a schematic view of a vehicle tire inflation system, according to an exemplary embodiment.

As suggested earlier, valve 30 and rotational fluid passage 20 may be used in conjunction with any desired tire inflation system, including central tire inflation systems. An exemplary tire inflation system 10 is shown in FIG. 6 for the purpose of better describing the invention. Tire inflation system 10 may be used on any desired vehicle 12, such as an over-the-road truck, road tractor, or tractor trailer. Tire inflation system 10 generally includes a pressurized gas source 60 (also referred herein as "pressure source") arranged in communication with a tire 80. A pressure controller 64 is arranged between the pressurized gas source 60 and the tire 80 to control the increase and decrease of the tire's internal inflation pressure (also referred herein as "tire inflation pressure"), which is represented as $P_T$. The gas supplied by pressure controller 64 to tire 80 is represented as having a regulated pressure $P_A$. Ultimately, pressure controller 64 communicates regulated pressure $P_A$ to rotational coupling 22, such as through member 76. While regulated pressure $P_A$ is typically lower than supplied pressure $P_S$, it is understood that be $P_A$ is may be higher than supplied pressure $P_S$. Fluid lines 62a, 62b are employed to maintain all components in fluid communication.

Pressure source 60 is configured to supply pressurized gas to the tire. The pressure of this supplied gas is represented as $P_S$. The pressurized gas is typically pressurized air, although any desired gas such as nitrogen may be used. Pressure source 60 itself may comprise any known source capable of pressurizing any desired gas. For example, tire inflation system 10 utilizes a pressure source provided by vehicle 12. In such instances, the pressure source is a compressor commonly used by trucks, road tractors, and other heavy duty vehicles to supply pressurized air for use in braking operations. This pressurized air may be stored in a holding tank for later use. In other arrangements, an independent pressure source may provided for use by the tire inflation system 10—in lieu of utilizing a pressure source otherwise provided by the vehicle.

To further inflate a tire and increase the tire inflation pressure, pressure source 60 provides positively pressured gas. Positive pressure describes any pressure above vacuum pressure, which is generally above 5 psia. However, when the tire is over inflated, it may be desirable to relieve the tire of any excess inflation pressure by partially deflating the tire until obtaining a desired tire inflation pressure. A reduction in a tire's internal pressure (represented as $P_T$) may be achieved by various means when the valve 30 is open during vehicle operation. For example, pressure source 20 may supply a gas having a pressure lower than the tire's internal pressure, such that the tire inflation pressure is reduced when placed in communication with the lower pressured gas. In particular variations, the lower pressure gas is supplied by a vacuum source, the lower pressure gas being approximately equal to or less than 5 psia or equal to or less than 0 psia. The vacuum source may comprise any means of providing vacuum pressure, such as a vacuum pump.

As suggested above with reference to FIG. 6, pressure source 60 is in communication with a pressure controller 64 configured to control the pressurization of gas supplied to tire 80. Pressure controller 64 may comprise any device configured to control such pressurization. In particular embodiments, pressure controller 64 is any known pressure regulator 66. As discussed above, such a regulator may comprise a self-relieving pressure regulator to allow any over inflated tire pressure to be vented through a vent 68 when valve 30 is open. In the exemplary inflation system shown, pressure regulator 66 is configured to supply a gas of desired pressure $P_A$ to tire 80. In lieu of pressure controller 64 supplying regulated gas of pressure $P_A$ to the rotational fluid passage 20, a controller may instead regulate pressure source 60 such that the pressure source supplies regulated gas of pressure $P_A$ to the rotational fluid passage 20.

Again, as suggested herein, the inflation system shown in the Figures represents only one of many possible embodiments of the invention. For example, axle 70 may comprise any known axle, which may form a driven axle (forming part of a vehicle's drive train and being driven by a motor) or a dead axle that either freely rotates or remains non-rotational. The axle may also be solid or hollow, which may be used to facilitate the communication of pressurized air to and from the tire. Finally, the axle may be a solid axle extending between wheels arranged on opposing sides of the vehicle or a split axle that is dedicated to a single wheel location on the vehicle. Accordingly, rotational fluid passage 20 may be arranged in communication with hub 74, in addition to or in lieu of, spindle 72, as there are various known means for arranging rotational fluid passage 20 in communication with a pressure source 60.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire inflation system comprising:
a pressure source;
a pressure controller in communication with the pressure source;
a rotational fluid passage arranged between a tire and a vehicle axle and in fluid communication with the pressure source, the rotational fluid passage configured to rotate about a rotational axis of a tire and including an inertia valve configured to operate between a normally closed valve arrangement and an open valve arrangement, the valve including a first compressible biasing member and a second compressible biasing member each arranged in communication with a mass displaceable in a radial direction relative to the rotational axis, each first and second compressible biasing member being configured to operate between an expanded arrangement and a compressed arrangement and the mass being configured to translate in the radial direction between a valve closed position and a valve open position, where in the closed valve arrangement each first and second compressible biasing member is in the expanded arrangement and the mass in the valve closed position and where in the open valve arrangement each first and second compressible biasing member is in the compressed arrangement and the mass in the valve open position, the valve open position of the mass being located a greater distance from the rotational axis than the valve closed position and the mass being configured to translate from the valve closed position to the valve open position when centrifugal forces acting on the mass are sufficient to overcome a combined spring force of the first and second compressible biasing members, the centrifugal forces arising as the valve rotates about the rotational axis at a desired rotational speed during tire rotation, where:
the valve further comprises:
a first end having a first end aperture in communication with the tire, a second end having a second end aperture in communication with the pressure source, and a fluid passage extending between the first and second end apertures, the first end being spaced apart from the second end in a radial direction relative the rotational axis of the tire;
a first sealing member configured to translate in cooperation with the mass, and to close the first end aperture when the mass is in the valve closed position and to open the first end aperture when the mass translates from the valve closed position and to the valve open position, where the first compressible biasing member maintains the first sealing member in a first end aperture-closed arrangement; and,
a second sealing member configured to translate in cooperation with the mass, and to close the second end aperture when the mass is in the valve closed position and to open the second end aperture when the mass translates from the valve closed position and to the valve open position, where the second compressible biasing member maintains the second sealing member in a first end aperture-closed arrangement.

2. The system of claim 1, where each of the first and second compressible biasing members comprises a compression spring.

3. The system of claim 1, wherein the fluid passage extends about the mass.

4. The system of claim 3, wherein the fluid passage extends through one or more chases extending through the mass.

5. The system of claim 1, where the pressure controller comprises a pressure regulator.

6. The system of claim 5, where the pressure regulator is a self-relieving pressure regulator or an electropneumatic pressure regulator.

7. The system of claim 1, where the mass is arranged a particular distance from the rotational axis to achieve a desired compression force acting against the first and second compressible biasing members at the desired rotational speed.

8. The system of claim 1, where the first compressible biasing member is spaced apart from the mass when the mass is in the valve closed position, such that the first compressible biasing member maintains the first sealing member in a first end aperture-closed arrangement independent of the second compressible biasing member, and such that the second compressible biasing member maintains the second sealing member in a second end aperture-closed arrangement independent of the first compressible biasing member.

9. The system of claim 1, where the first compressible biasing member is arranged within the second compressible biasing member.

10. The system of claim 1, where the first compressible biasing member is arranged in parallel with the second compressible biasing member.

11. A method for adjusting the inflation pressure of a tire, the method comprising the steps of:
arranging a tire in fluid communication with an inflation pressure source on a vehicle;
arranging a rotational fluid passage between the tire and a vehicle axle;
arranging along the rotational fluid passage an inertia valve that is biased in a closed arrangement while the valve is rotating below a desired speed about a rotational axis;
opening the inertia valve when the valve is rotating about the rotational axis at or above the desired speed; and,
adjusting automatically the inflation pressure of the tire through the rotational fluid passage while the valve is open;
where the inertia valve is configured to operate between the closed arrangement and the open arrangement, the valve including a first compressible biasing member and a second compressible biasing member each arranged in communication with a mass displaceable in a radial direction relative to the rotational axis, each first and second compressible biasing member being configured to operate between an expanded arrangement and a compressed arrangement and the mass being configured to translate in the radial direction between a valve closed position and a valve open position, where in the closed valve arrangement each first and second compressible biasing member is in the expanded arrangement and the mass in the valve closed position and where in the open valve arrangement each first and second compressible biasing member is in the compressed arrangement and the mass in the valve open position, the valve open position of the mass being located a greater distance from the rotational axis than the valve closed position and the mass being configured to translate from the valve closed position to the valve open position when centrifugal forces acting on the mass are sufficient to overcome a combined spring force of the first and second compressible biasing members, the centrifugal forces arising as the valve rotates about the rotational axis at a desired rotational speed during tire rotation, where:
the valve further comprises:
a first end having a first end aperture in communication with the tire, a second end having a second end aperture in communication with the pressure source, and a fluid passage extending between the first and second end apertures, the first end being spaced apart from the second end in a radial direction relative the rotational axis of the tire;
a first sealing member configured to translate in cooperation with the mass, and to close the first end aperture when the mass is in the valve closed position and to open the first end aperture when the mass translates from the valve closed position and to the valve open position, where the first compressible biasing member maintains the first sealing member in a first end aperture-closed arrangement; and,
a second sealing member configured to translate in cooperation with the mass, and to close the second end aperture when the mass is in the valve closed position and to open the second end aperture when the mass translates from the valve closed position and to the valve open position, where the second compressible biasing member maintains the second sealing member in a first end aperture-closed arrangement.

12. The method of claim 11, where the step of adjusting the inflation pressure comprises increasing the tire inflation pressure if the tire inflation pressure is below a desired pressure.

13. The method of claim 11, where the step of adjusting the inflation pressure comprises reducing the tire inflation pressure if the tire inflation pressure is above a desired pressure.

14. The method of claim 11, wherein the step of adjusting automatically the tire inflation pressure is performed by a self-relieving pressure regulator.

15. The method of claim 11, wherein the inflation pressure source, the rotational fluid passage, and the inertia valve form a portion of a tire inflation system.

16. The method of claim 15, wherein the step of adjusting automatically the tire inflation pressure is performed by a pressure regulator.

17. The method of claim 11, where each of the first and second compressible biasing members comprises a compression spring.

18. The method of claim 11, where the first compressible biasing member is spaced apart from the mass when the mass is in the valve closed position, such that the first compressible biasing member maintains the first sealing member in a first end aperture-closed arrangement independent of the second compressible biasing member, and such that the second compressible biasing member maintains the second sealing member in a second end aperture-closed arrangement independent of the first compressible biasing member.

19. The method of claim 11, where the first compressible biasing member is arranged within the second compressible biasing member.

20. The method of claim 11, where the first compressible biasing member is arranged in parallel with the second compressible biasing member.

* * * * *